(12) United States Patent
Yamada et al.

(10) Patent No.: US 7,431,256 B2
(45) Date of Patent: Oct. 7, 2008

(54) SEAT SLIDE DEVICE

(75) Inventors: Takahiro Yamada, Chiryu (JP);
Hiroyuki Okazaki, Chiryu (JP);
Toshiyuki Tanaka, Kariya (JP)

(73) Assignee: Aisin Seiki Kabushiki Kaisha,
Kariya-Shi, Aichi-Ken (JP)

( * ) Notice: Subject to any disclaimer, the term of this patent is extended or adjusted under 35 U.S.C. 154(b) by 410 days.

(21) Appl. No.: 11/190,082

(22) Filed: Jul. 27, 2005

(65) Prior Publication Data

US 2006/0022109 A1 Feb. 2, 2006

(30) Foreign Application Priority Data

Jul. 27, 2004 (JP) .............................. 2004-219055

(51) Int. Cl.
*F16M 13/00* (2006.01)

(52) U.S. Cl. .................... 248/429; 248/424; 297/344.11

(58) Field of Classification Search ................. 248/424, 248/429, 430; 297/344.11
See application file for complete search history.

(56) References Cited

FOREIGN PATENT DOCUMENTS

JP 10-100752 4/1998

*Primary Examiner*—Kimberly T Wood
(74) *Attorney, Agent, or Firm*—Buchanan Ingersoll & Rooney PC

(57) ABSTRACT

A seat slide device comprises a lower rail fixed to a vehicle floor, an upper rail supporting a seat, a lock and unlock mechanism including a main lock plate and a sub lock plate for maintaining the upper rail so as to be slidable on the lower rail, the main lock plate rotatably supported by a first bracket fixed to the upper rail, the sub lock plate rotatably supported by a second bracket fixed to the upper rail, an engaging hole formed on the lower rail, and a claw portion formed on the sub lock plate so as to contact to an upper surface of the engaging hole in order to press down the upper rail.

20 Claims, 4 Drawing Sheets

SEAT SLIDE DEVICE

CROSS REFERENCE TO RELATED APPLICATIONS

This application is based on and claims priority under 35 U.S.C. § 119 to Japanese Patent Application 2004-219055, filed on Jul. 27, 2004, the entire content of which is incorporated herein by reference.

FIELD OF THE INVENTION

This invention relates to a seat slide device by which a rattling of an upper rail against a lower rail can be reduced.

BACKGROUND

A known seat slide device includes a lower rail fixed on a vehicle floor and an upper rail positioned so as to be slidable on the lower rail. In this configuration, a seat is fixed on the upper rail.

In order to smooth the movement of the upper rail sliding on the lower rail, a bearing is provided between the upper rail and the lower rail. Specifically, the bearing is supported by the upper rail so as to rotate on the lower rail.

Further, the seat slide device includes a lock and unlock mechanism for locking (engaging) and unlocking (disengaging) the upper rail, to which the seat is fixed, relative to the lower rail.

Specifically, the lock and unlock mechanism includes a main lock plate, which is comprised of a hook portion and a main body.

More specifically, the hook portion is normally biased by means of a spring so as to engage with a lock hole formed on the lower rail, and the main body is moved by means of an operation handle in an unlocked direction against the biasing force from the spring.

The hook portion is integrally formed on the main body at a lower end portion thereof, and the operation handle is provided so as to press down an upper end portion of the main body.

In such configuration, a pair of bearing is supported by the upper rail so as to slide on a bottom portion of the U-shaped lower rail, and a space is provided between an upper portion of the lower rail and each of the bearings. This space may cause a rattling, especially vibrations of the upper rail against the lower rail in a vertical direction.

JP10-100752A discloses a seat slide in which a pair of wedge stoppers is inserted between the upper portion of the lower rail and the bearing while the upper rail is locked with the lower rail so that the rattling of the upper rail against the lower rail is reduced.

However, in order to insert two stoppers around the bearings provided both sides of the lower rail at the same time, the seat slide device needs to be configured accurately, and the stoppers need to be operated precisely. This makes the device unpractical. Thus, a need exist for the seat slide device to reduce the rattling of the upper rail against the lower rail in practical ways.

SUMMARY OF THE INVENTION

According to an aspect of the present invention, a seat slide device comprises a lower rail fixed to a vehicle floor, an upper rail supporting a seat, a lock and unlock mechanism including a main lock plate and a sub lock plate for maintaining the upper rail so as to be slidable on the lower rail, the main lock plate rotatably supported by a first bracket fixed to the upper rail, the sub lock plate rotatably supported by a second bracket fixed to the upper rail, an engaging hole formed on the lower rail, and a claw portion formed on the sub lock plate so as to contact to an upper surface of the engaging hole in order to press down the upper rail.

According to another aspect of the present invention, a seat slide device comprises a lower rail fixed to a vehicle floor, an upper rail supporting a seat, a lock and unlock mechanism including a main lock plate and a sub lock plate for maintaining the upper rail so as to be slidable on the lower rail, the main lock plate rotatably supported by a first bracket fixed to the upper rail, the sub lock plate rotatably supported by a second bracket fixed to the upper rail, plural engaging holes formed on the lower rail, a hook portion formed on the main lock plate and rotated so as to insert into a part of the engaging holes in conjunction with the rotation of the lock and unlock mechanism, a claw portion formed on the sub lock plate and rotated so as to insert into a part of the engaging holes in conjunction with the rotation of the lock and unlock mechanism, wherein, when the hook portion and the claw portion insert into the engaging holes, the claw portion contacts to an upper surface of the engaging hole, and an upper portion of the hook portion, which face the upper surface of the engaging hole, is positioned lower than a position of the claw portion.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
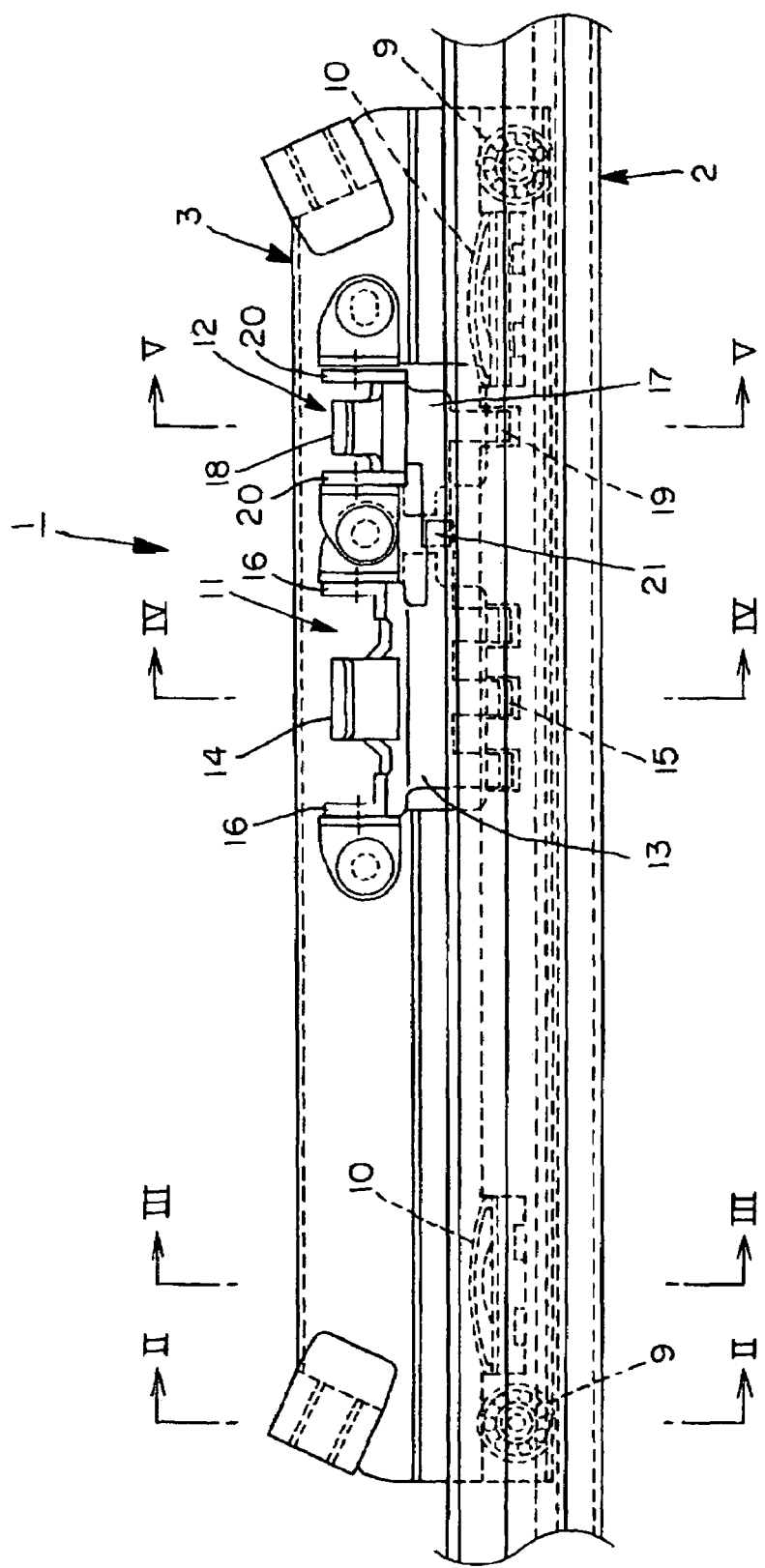
FIG. 1 illustrates a front view of a seat slide device.
Figure 2:
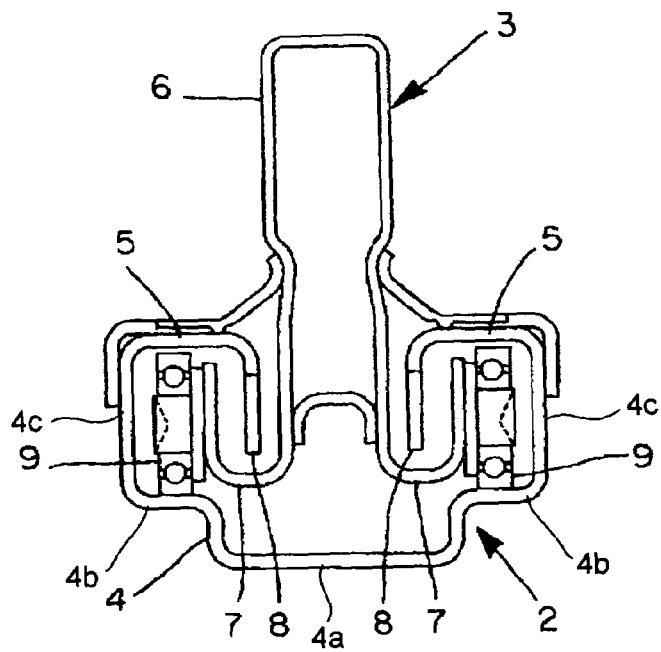
FIG. 2 illustrates a cross section of the seat slide device illustrated in FIG. 1 along a II-II line seen in an arrow direction.

As shown in FIG. 1, a seat slide device 1 for a vehicle includes a lower rail 2, which is fixed on the vehicle floor, and an upper rail 3, which is provided so as to be slidable on the lower rail 2. Further, the seat slide device 1 includes a lock and unlock mechanism 100 for locking (engaging) and unlocking (disengaging) the upper rail 3 relative to the lower rail 2. As shown in FIG. 2, the lower rail 2 is comprised of a main body portion 4 and flange portions 5.

Specifically, the main body portion 4 includes vertical wall portions 4c and a first bottom portion 4a provided between the vertical wall portions 4c. Both end portions of the first bottom portion 4a are stepped so as to form second bottom portions 4b. Thus, the main body portion 4 is formed in approximately a U-shape in cross section.

Further, each of the flange portions 5 is formed so as to extend inward from an upper end of each of the vertical wall portions 4c. The flange portions 5 further extend downward in a vertical direction so as to form vertical portions 8.

On the other hand, the upper rail 3 includes a main body portion 6 and mounting portions 7. Specifically, the main body portion 6 is formed in an upside-down U-shape so as to includes two vertical walls, and each of the vertical walls extends outward from each of the lower ends of the vertical walls, and then further extends upward so as to form the U-shaped mounting portion 7. In circumstances where the upper rail 3 is mounted to the lower rail 2, each of the vertical portions 8 of the flange portions 5 is positioned within each of the mounting portions 7.

As shown in FIG. 2, a pair of bearings 9 is attached to the mounting portions 7 of the upper rail 3. Each of the bearings 9 is positioned so as to rotate on each of the second bottom portions 4b of the main body portion 4, and in this circumstance, a space is provided between a top end of each of the bearing 9 and an inner surface of each of the flange portions 5.

Figure 3:
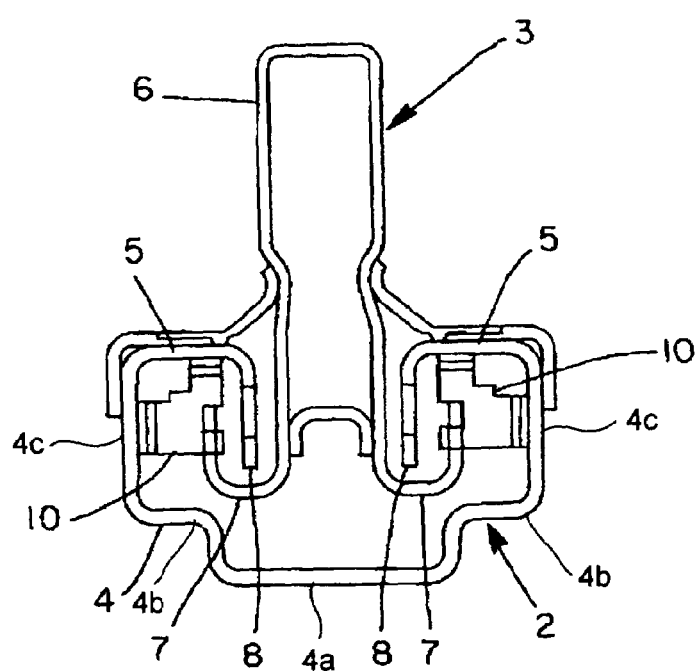
FIG. 3 illustrates a cross section of the seat slide device illustrated in FIG. 1 along a III-III line seen in an arrow direction.

Further, as shown in FIG. 1, two pairs of the bearings 9 are provided on the upper rail 3, one pair provided on the front thereof and the other pair provided on the rear thereof. As shown in FIG. 3, a pair of shoes 10 is fixed to the upper rail at the mounting portions 7 so as to slide on the inner surface of the flange portion 5 and the inner surface of the vertical wall portion 4c in order to smooth the slide of the upper rail 3 on the lower rail 3.

Figure 4:
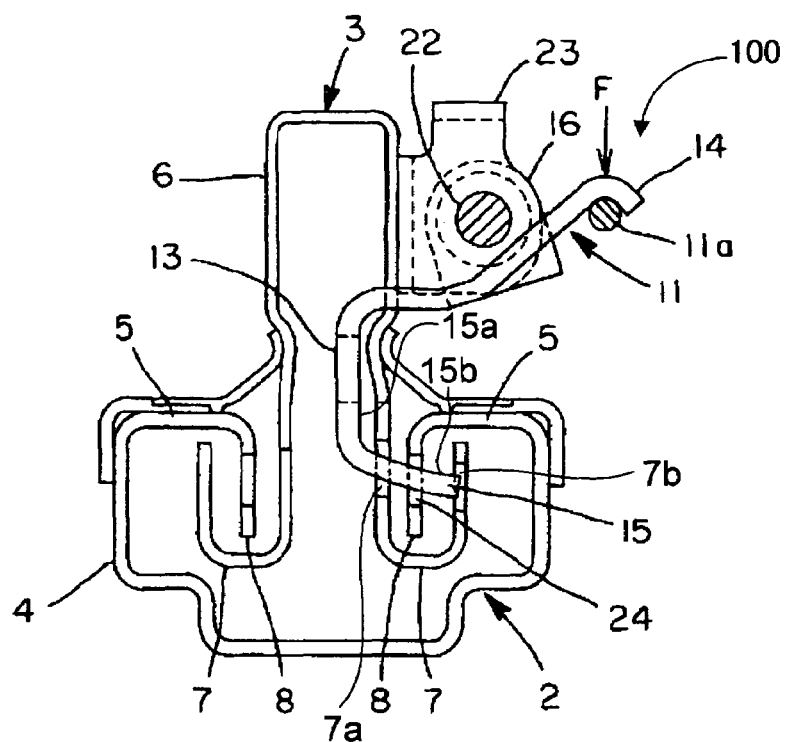
FIG. 4 illustrates a cross section of the seat slide device illustrated in FIG. 1 along a IV-IV line seen in an arrow direction.
Figure 5:
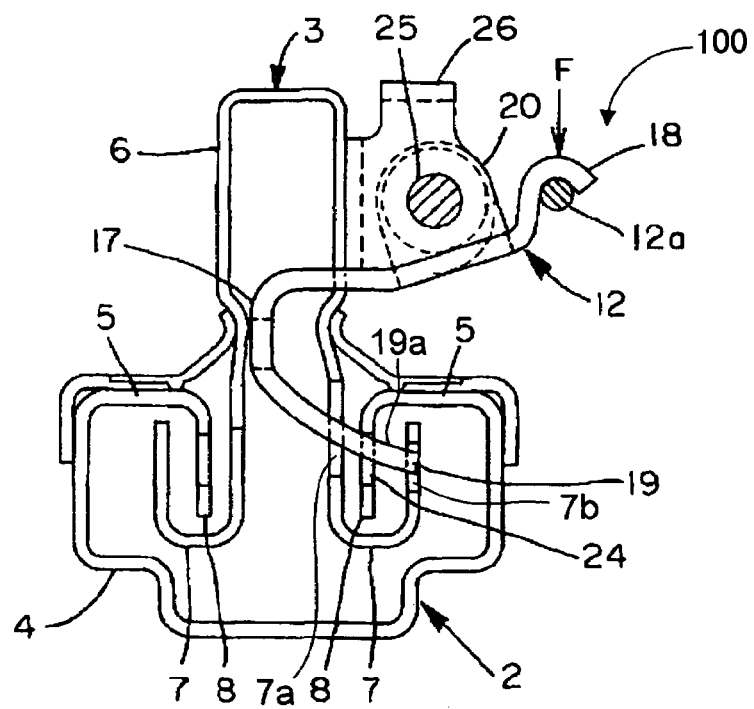
FIG. 5 illustrates a cross section of the seat slide device illustrated in FIG. 1 along a V-V line seen in an arrow direction.

Further, as shown in FIG. 1, FIG. 4 and FIG. 5, on one side of the main body portion 6 of the upper rail 3, a main lock plate 11 and a sub lock plate 12 are provided so as to be connected together.

Figure 6:
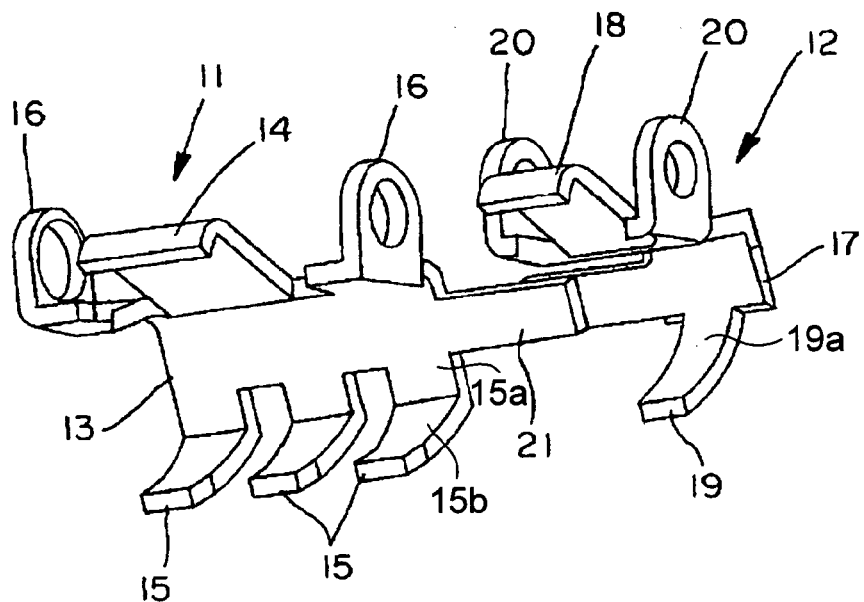
FIG. 6 illustrates an oblique perspective view of a main lock plate and a sub lock plate of the seat slide device and FIG. 7 illustrates an oblique perspective view showing another example of a main lock plate and a sub lock plate of the seat slide device.

Further, as shown in FIG. 6, the main lock plate 11 includes a main body 13, a protruding portion 21, an operating portion 14, hook portions 15 and mounting portions 16. Specifically, the operating portion 14 is provided at the upper portion of the main body 13, the mounting portions 16 are also provided at the upper portion of the main body 13 so as to sandwich the operating portion 14, and the hook portions 15 are provided at the lower portion of the main body 13.

On the other hand, the sub lock plate 12 includes a main body 17, an operating portion 18, a claw portion 19 and mounting portions 20. Specifically, the operating portion 18 is provided at the upper portion of the main body 17, the mounting portions 20 are also provided at the upper portion of the main body 13 so as to sandwich the operating portion 18, and the claw portion 19 is provided at the lower portion of the main body 17.

The main lock plate 11 and the sub lock plate 12 are connected together in a manner where the protruding portion 21 of the main lock plate 11 overlaps the main body 17 of the sub lock plate 12. In this circumstance, when an operation force is applied to the operating portion 14 in a downward direction in FIG. 6 by means of an operation handle (not shown), the main lock plate 11 rotates in an anticlockwise direction relative to a pin hole of the mounting portion 16 so as to be unlocked. In conjunction with the rotation of the main lock plate 11, the sub lock plate 12 is also rotated by means of the protruding portion 21.

Further, as shown in FIG. 4, the main lock plate 11 is rotatably supported by the upper rail 3 in a manner where the mounting portions 16 of the main lock plate 11 is attached to brackets 23 of the upper rail 3 by means of pins 22. Thus, the hook portion 15 is positioned so as to be able to insert into lock holes (engaging holes) 24, which are formed on the vertical portion 8 of the lower rail 2.

In addition, on the mounting portion 7 of the upper rail 3, cut portions 7a and 7b are formed so as not to interrupt the rotation of the hook portion 15.

The main lock plate 11 is normally biased by means of the spring 11a in an anticlockwise direction in FIG. 4 so that the hook portions 15 engage with the lock holes 24, and thus the upper rail 3 can be locked with the lower rail 2.

Thus, when a force (F) is applied to the operating portion 14 of the main lock plate 11 in a downward direction by means of the operation handle, the main lock plate 11 is rotated in a clockwise direction relative to the pins 22, and then the hook portions 15 disengage from the lock hole 24. Thus, the upper rail 3 becomes slidable on the lower rail 2.

Further, as shown in FIG. 5, the mounting portion 20 of the sub lock plate 12 is rotatably supported by mount brackets 26 of the upper rail 3 by means of pins 25.

On the other hand, the sub lock plate 12 is normally biased by means of a spring 12a in an anticlockwise direction so that the claw portion 19 can insert into the lock hole 24 formed on the vertical portion 8 of the lower rail 2.

As shown in FIG. 6, a height of the main body 13 of the main lock plate 11 is approximately identical with a height of the main body 17 of the sub lock plate 12.

Further, each of the hook portions 15 includes a vertical portion 15a and a protruding portion 15b.

Specifically, the vertical portion 15a extends in a downward direction from a lower end of the main body 13, and, when the upper rail 3 mounted to the lower rail 2 is locked, the protruding portion 15b extends toward the lock holes 24 from a lower end of the vertical portion 15a.

On the other hand, the claw portion 19 doesn't include a vertical portion, which corresponds to the vertical portion 15a of the hook portion 15, and includes a protruding portion 19a that extends toward the lock hole 24 from a lower end of the main body 17.

Thus, in a condition where the claw portion 19 inserts into the lock hole 24 as shown in FIG. 5, the protruding portion 19 of the claw portion 19 contacts to the upper surface of the lock hole 24.

In circumstances where the hook portions 15 insert into the lock holes 24 as shown in FIG. 4, the protruding portions 15b of the hook portions 15, which face the upper surface of the lock holes 24, are positioned lower than the position of the protruding portion 19a.

Thus, as the claw portion 19 further inserts into the lock hole 24 with contacting to the upper surface of the lock hole 24, a contacting point between the claw portion 19 and the upper surface of the lock hole 24 raises, and a force for pressing the upper rail 3 in a downward direction becomes larger, as a result, a rattling and vibrations of the lower rail 2 against the upper rail 3 can be reduced.

Figure 7:
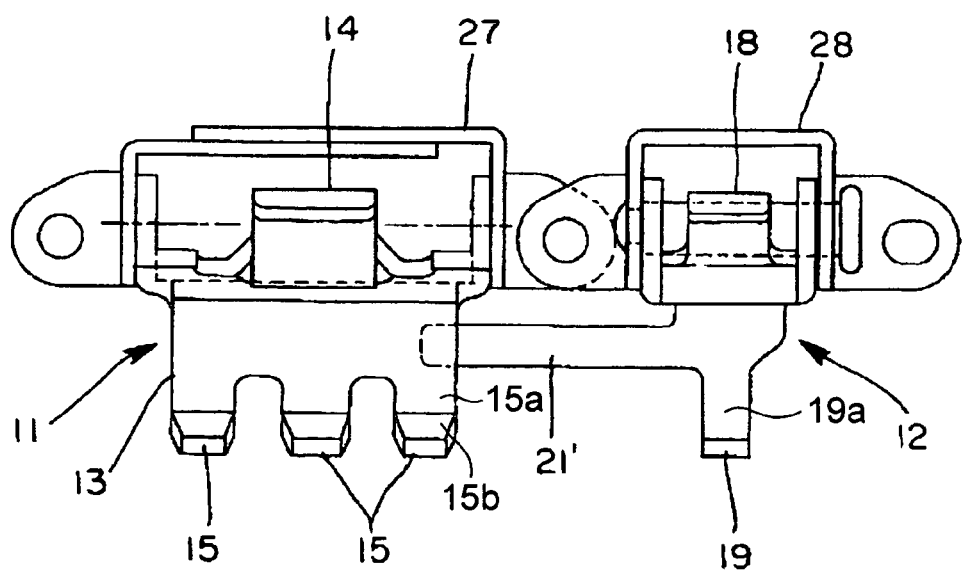

Further, as shown in FIG. 7, a width of the protruding portion 19a of the claw portion 19 is smaller than a width of the protruding portion 15b of the hook portion 15. Thus, it can be prevented that the protruding portion 19a of the claw portion 19 contacts to the lock hole 24 in a longitudinal direction of the vehicle.

The sub lock plate 12 can be unlocked by operating the operation handle (not shown) in order to apply the operation force (F) to the operating portion 18, or by rotating the sub lock plate 12 against the biasing force of the spring by means of the protruding portion 21 of the main lock plate 11, which is operated by the operation force applied by the operating portion 14.

FIG. 7 illustrates another example of the seat slide device, in which the sub lock plate 12 includes a protruding portion 21', and the main body 13 of the main lock plate 11 overlaps the protruding portion 21'.

Further, in the example shown in FIG. 7, the main lock plate 11 is rotatably supported by mount brackets 27, and the mount brackets 27 are fixed to the brackets 23 of the upper rail 3.

The sub lock plate 12 is rotatably supported by a mount bracket 28, and the mount bracket 28 is fixed to the bracket 26 of the upper rail 26.

In this example shown in FIG. 7, the mount brackets 27 and the mount bracket 28 commonly use a part of mounting bolts, which are used for mounting these brackets to the bracket 23 and the bracket 26.

Further, in this example, as the claw portion 19 inserts into the lock hole 24, a contacting point between the claw portion 19 and the upper surface of the lock hole 24 raises, and a force for pressing the upper rail 3 in a downward direction becomes larger, as a result, effect to reduce a rattling or vibrations of the lower rail 2 against the upper rail 3 can be enhanced.

The sub lock plate 12 can be rotated in an unlocked direction in conjunction with the rotation of the main lock plate 11. Specifically, when a force is applied to the operating portion 14 of the main lock plate 11, the force is further transmitted to the sub lock plate 12 by means of the protruding portion 21'. Thus, the sub lock plate 12 can be unlocked by means of the operating portion 14 of the main lock plate 11.

Alternatively, the seat slide device may be configured that the force is applied to both the operating portions 14 of the main plate 11 and the operating portion 18 of the sub plate 12.

According to the present invention, a seat slide device comprises a lower rail fixed to a vehicle floor, an upper rail supporting a seat, a lock and unlock mechanism including a main lock plate and a sub lock plate for maintaining the upper rail so as to be slidable on the lower rail, the main lock plate rotatably supported by a first bracket fixed to the upper rail, the sub lock plate rotatably supported by a second bracket fixed to the upper rail, and a claw portion formed on the sub lock plate so as to contact to an upper surface of an engaging hole of the lower rail in order to press down the upper rail.

Preferably, the claw portion is formed in a manner where, when the claw portion is positioned so as to insert into the engaging holes, its height gradually increases from a top thereof. Further, the sub lock plate is moved so as to be unlocked in conjunction with the movement of the main lock plate so as to be unlocked.

Furthermore, the main lock plate is biased in a first direction by means of a first spring, and the sub lock plate is also biased in the first direction by means of a second spring.

While the main lock plate and the sub lock plate is biased by means of the spring, the claw portion of the sub lock plate is engaged with the upper portion of the engaging hole (lock hole) of the lower rail so that the sub lock plate presses the upper rail in a downward direction.

Thus, the rattling of the upper rail against the lower rail can be reduced by means of the sub lock plate by it self. Further, because the sub lock plate can be rotated in conjunction with the rotation of the main lock plate, both the main lock plate and the sub lock plate can be rotated by applying the force to either one of the main lock plate or the sub lock plate. In such a simple configuration, the upper rail can be unlocked from the lower rail without any difficulty.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A seat slide device comprising:
   a lower rail fixed to a vehicle floor;
   an upper rail supporting a seat;
   a lock and unlock mechanism including a main lock plate and a sub lock plate for maintaining the upper rail so as to be slidable on the lower rail;
   the main lock plate rotatably supported by a first bracket fixed to the upper rail;
   the sub lock plate rotatably supported by a second bracket fixed to the upper rail;
   an engaging hole formed on the lower rail; and
   a claw portion formed on the sub lock plate so as to contact to an upper surface of the engaging hole in order to press down the upper rail.

2. A seat slide device according to claim 1, wherein the claw portion is formed in a manner where its height gradually increases from a top thereof when the claw portion is positioned so as to insert into the engaging hole.

3. A seat slide device according to claim 1, wherein the sub lock plate is moved in an unlocked direction in conjunction with the movement of the main lock plate in the unlocked direction.

4. A seat slide device according to claim 2, wherein the sub lock plate is moved in an unlocked direction in conjunction with the movement of the main lock plate in the unlocked direction.

5. A seat slide device according to claim 1, wherein the main lock plate is biased in a first direction by means of a first spring, and the sub lock plate is biased in the first direction by means of a second spring.

6. A seat slide device according to claim 2, wherein the main lock plate is biased in a first direction by means of a first spring, and the sub lock plate is biased in the first direction by means of a second spring.

7. A seat slide device according to claim 3, wherein the main lock plate is biased in a first direction by means of a first spring, and the sub lock plate is biased in the first direction by means of a second spring.

8. A seat slide device according to claim 4, wherein the main lock plate is biased in a first direction by means of a first spring, and the sub lock plate is biased in the first direction by means of a second spring.

9. A seat slide device according to claim 1, wherein a width of the claw portion is set so as to be smaller than a width of a hook portion, which is formed on the main lock plate.

10. A seat slide device according to claim 2, wherein a width of the claw portion is set so as to be smaller than a width of a hook portion, which is formed on the main lock plate.

11. A seat slide device comprising:
    a lower rail fixed to a vehicle floor;
    an upper rail supporting a seat;
    a lock and unlock mechanism including a main lock plate and a sub lock plate for maintaining the upper rail so as to be slidable on the lower rail;
    the main lock plate rotatably supported by a first bracket fixed to the upper rail;
    the sub lock plate rotatably supported by a second bracket fixed to the upper rail;

plural engaging holes formed on the lower rail;

a hook portion formed on the main lock plate and rotated so as to insert into a part of the engaging holes in conjunction with the rotation of the lock and unlock mechanism; and a claw portion formed on the sub lock plate and rotated so as to insert into a part of the engaging holes in conjunction with the rotation of the lock and unlock mechanism, wherein, when the hook portion and the claw portion insert into the engaging holes, the claw portion contacts to an upper surface of the engaging hole, and an upper portion of the hook portion, which face the upper surface of the engaging hole, is positioned lower than a position of the claw portion.

12. A seat slide device according to claim 11, wherein the claw portion is formed in a manner where its height gradually increases from a top thereof when the claw portion is positioned so as to insert into the engaging hole.

13. A seat slide device according to claim 11, wherein the sub lock plate is moved in an unlocked direction in conjunction with the movement of the main lock plate in the unlocked direction.

14. A seat slide device according to claim 12, wherein the sub lock plate is moved in an unlocked direction in conjunction with the movement of the main lock plate in the unlocked direction.

15. A seat slide device according to claim 11, wherein the main lock plate is biased in a first direction by means of a first spring, and the sub lock plate is biased in the first direction by means of a second spring.

16. A seat slide device according to claim 12, wherein the main lock plate is biased in a first direction by means of a first spring, and the sub lock plate is biased in the first direction by means of a second spring.

17. A seat slide device according to claim 13, wherein the main lock plate is biased in a first direction by means of a first spring, and the sub lock plate is biased in the first direction by means of a second spring.

18. A seat slide device according to claim 14, wherein the main lock plate is biased in a first direction by means of a first spring, and the sub lock plate is biased in the first direction by means of a second spring.

19. A seat slide device according to claim 11, wherein a width of the claw portion is set so as to be smaller than a width of the hook portion.

20. A seat slide device according to claim 12, wherein a width of the claw portion is set so as to be smaller than a width of the hook portion.

* * * * *